United States Patent Office 3,540,872
Patented Nov. 17, 1970

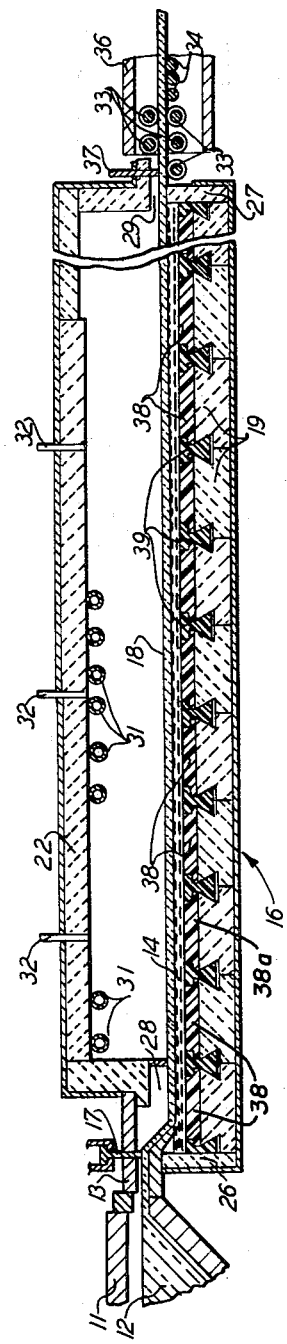
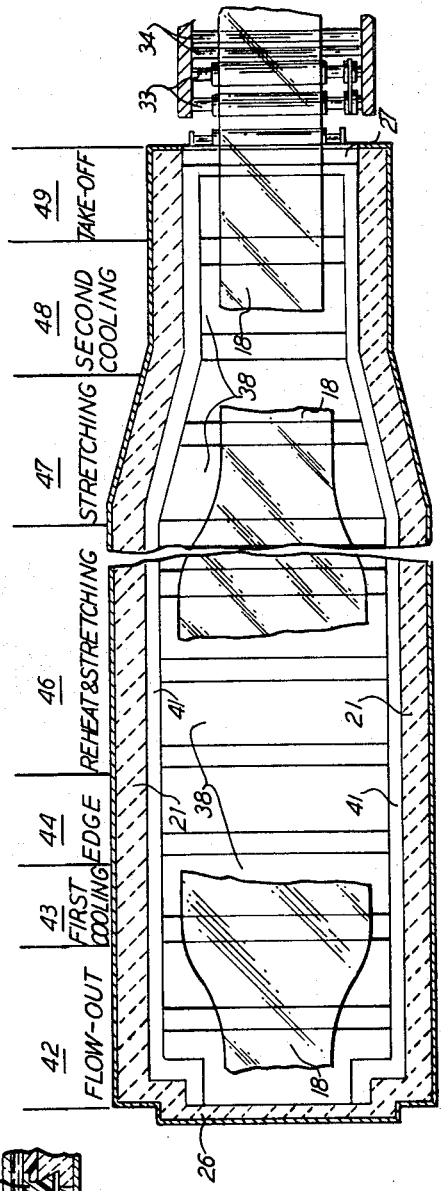
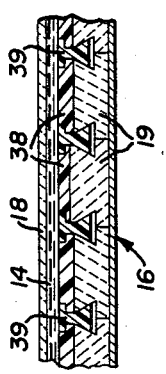

3,540,872
METHOD OF AND CHAMBER FOR THE MANUFACTURE OF FLAT GLASS
Thomas H. Oster, Dearborn, Mich., assignor to Ford Motor Company, Dearborn, Mich., a corporation of Delaware
Filed Oct. 6, 1967, Ser. No. 673,434
Int. Cl. C03b 18/02
U.S. Cl. 65—65                                11 Claims

ABSTRACT OF THE DISCLOSURE

A substantially enclosed chamber utilized in the float process of manufacturing flat glass contains refractory to define a cavity in which a molten metal bath is supported. The refractory defining the cavity is lined with slabs of carbonaceous material. In accordance with the functionally classified nature of particular zones of the chamber, carbonaceous material having high and low thermal conductances is utilized to control the extent of the heat transfer through the liner in the respective zones. The zone in which the high conductance liner is located is maintained at a relatively high temperature; and the zone in which the low conductance liner is located is maintained at a temperature below said high temperature.

BACKGROUND OF THE INVENTION

This invention relates to the construction and operation of a chamber for utilization in the manufacture of flat glass by the so-called "float process." In the "float process," molten glass is poured on the surface of a molten bath contained in a chamber to obtain a glass ribbon having true parallelism of its opposite faces and a lustrous, firepolished finish.

Generally, in the "float process," the molten bath is formed from metal having a density greater than that of molten glass. By known means, the molten glass is delivered at a uniform rate to the surface of the molten bath to form a ribbon of glass. The ribbon is then advanced along the surface of the bath under thermal conditions which permit the leading portion thereof to continuously harden to a degree sufficient to permit its removal from the bath without harm to the surfaces thereof. Upon its removal from the chamber, the ribbon of glass passes through an annealing lehr and is subjected to further conventional processing.

The molten bath, which supports the glass, is contained within a substantially enclosed chamber having upper and lower refractory sections joined by side and end wall structures. The end wall structures have therein entrance and exit passageways through which, respectively, the molten glass is fed to and the glass ribbon removed from the chamber. The lower refractory section forms the container for receiving and supporting the molten metal bath. The space within the chamber above the bath is filled with a protective atmosphere to prevent oxidation of the metal forming the bath.

The "float process" of manufacturing glass has been improved by lining at least a portion of the chamber containing the molten metal bath with solid slabs of a carbonaceous material. Such slabs, usually made from graphite, are positioned in the chamber in a manner and for a purpose more fully disclosed in U.S. Pat. 3,393,061 application assigned to the same assignes as this application. The utilization of a liner formed from solid slabs of carbonaceous material has its advantages. However, a carbonaceous material such as graphite can be an excellent thermal conductor. As such, heat is conducted away from various hotter zones of the chamber to cooler zones of the chamber when such a liner is utilized.

The loss of heat from hotter zones of the chamber to cooler zones is, of course, not desirable. Such heat losses must be compensated for by supplying additional heat to the hotter zones of the chamber. On the other hand, the interruption of the conductive heat transfer through the carbonaceous liner by removal of carbonaceous slabs from certain zones of the chamber has its attendant difficulties in that these zones of the chamber will not have a protective lining therein. In these unprotected zones of the chamber, wherein only refractory material is utilized to define the bottom of the metal receiving cavity, the refractory is more prone to being damaged by contact therewith of the glass ribbon.

SUMMARY OF THE INVENTION

This invention is directed to a construction for and a method of operating a chamber utilized in the "float process" of manufacturing glass, and more particularly, this invention is directed to the construction of and manner of operating such a chamber wherein conductive heat transfer through a liner of carbonaceous material is controlled in various functionally classified zones of the chamber.

In accordance with the principles and teachings of this invention, the method of manufacturing flat glass in the improved chamber is as follows. The chamber contains refractory material which holds and supports a molten metal bath therein which in turn supports molten glass poured out thereon. A linear of carbonacoues material is provided for the refractory material and the liner is at least partly positioned below the top surface of the molten metal bath. The thermal conductance of different areas of the carbonaceous material is controlled such that at least two areas of the material are present, respectively, in two functionally classified zones of the chamber. One area of the material has a high thermal conductance and the other a low thermal conductance and the two areas are in adjacent zones of the chamber. The temperature in the zone containing the high conductance material is maintained at a relatively high level and the material permits a uniform tempertaure profile to be established across the glass in the zone. The low conductance material is utilized in a zone of the chamber maintained at a temperature below the high temperature and aids in reducing the amount of heat dissipated from the hot zone to the cool zone.

In accordance with the more detailed teachings of this invention, the areas of high and low thermal conductance are established by utilizing carbonaceous material having substantially different thermal conductivities or of different substantial thicknesses.

BRIEF DESCRIPTION OF THE DRAWINGS

FIG. 1 is an elevational view, in cross section, showing the improved chamber of this invention for utilization in the manufacture of flat glass. FIG. 2 is a plan view, in cross section, of the improved chamber of FIG. 1. FIG. 3 is an elevational view showing an alternate form for the construction of the improved chamber.

DESCRIPTION OF THE PREFERRED EMBODIMENT

General construction of float chamber

Referring now to the drawings, in FIG. 1 there is seen the delivery end of a conventional glass melting furnace 11 in which a constant level of glass 12 is maintained. The molten glass is delivered through a forehearth 13 onto the surface of a bath 14 of molten tin contained within a chamber, generally identified by the numeral 16. A tweel 17 controls the rate of glass flow from the furnace 11. The molten bath 14 has a density greater than that of glass 12 so the glass will float on the surface thereof. By delivering molten glass at a constant rate and by withdrawing a continuous sheet of glass thus formed at a constant rate, a continuous ribbon of glass 18 of uniform width is produced. Preferably, the bath 14 is molten tin but an alloy of tin may also be utilized.

The chamber 16 has a lower refractory section, generally identified by the numeral 19, which is composed of a plurality of refractory block. The chamber also has refractory side blocks 21, an upper refractory section 22 and refractory end walls 26 and 27. All of the refractory walls or sections both are formed from a plurality of refractory blocks and are joined together except for a restricted entrance 28 and exit 29 to provide the substantially enclosed chamber 16. The refractory side blocks 21 and the refractory end walls 26 and 27 project above the top surface of the lower refractory section 19 to define the cavity or container for receiving the molten tin 14.

To maintain the tin in a molten condition and the glass ribbon 18 at the proper temperatures required to form a ribbon of good optical quality, electrical heaters 31 (FIG. 1) are installed in the upper refractory section 22 of the chamber 16. Coolers may also be installed in cooling zones of the chamber 16 to assure that the glass ribbon will be sufficiently cooled and hardened to be removed through the exit 29 without damage to the ribbon. The electrical heaters 31 are connected to a conventional power source (not shown) and may be individually controlled to provide the desired thermal gradient between the various functionally classified zones of the chamber thereby to obtain the desired rate of cooling of the ribbon 18 as it progresses through the chamber. Preferably, the molten glass 12 is introduced into the chamber at a temperature of about 1850° F. and then, as the glass solidifies to form the ribbon, the glass is progressively cooled to a temperature of about 1100° F. at the exit 29.

An atmosphere gas is introduced into the chamber 16 through gas inlets 32 in order to provide a protective atmosphere within the chamber above the molten tin and the glass floating thereupon. The atmosphere gas should be inert toward both carbonaceous material and the tin making up the bath and actively reducing toward tin oxide. Also, the atmosphere gas should contain not more than traces of oxygen, carbon dioxide or water vapor. As more fully described in U.S. Pat. 3,332,763, issued July 25, 1967, and assigned to the same assignee as this application, a protective atmosphere consisting essentially of, by volume, 4% carbon monoxide, 4% hydrogen and the remainder nitrogen, is the preferred inert atmosphere when carbonaceous material is utilized in the chamber.

The cooled glass ribbon 18 is withdrawn by driven traction rolls 33 onto a conveyor 34 to enter an annealing lehr 36 where the ribbon 18 is further cooled under controlled conditions to remove or reduce residual stresses therein. The exit 29 of the chamber 16 may be provided with a sealing member 37 to retain the protective atmosphere gas in and prevent the entrance of outside atmosphere into the chamber.

As described more fully in previously mentioned Pat. 3,396,061 a series of rectangular slabs 38, preferably of solid carbonaceous material, are provided in the chamber 16.

In FIG. 2 the individual slabs 38 are shown as running the full width of the chamber 16. However, it should be appreciated that one width of the chamber is lined with a plurality of the slabs 38. These slabs are preferably co-extensive with a plurality of the refractory blocks utilized to line one transverse width of the chamber such that if any upheaval occurs in the lower refractory section 19, the individual liner slabs will adjust to the situation and there will be no buckling or cracking of a unitary piece of carbonaceous material.

With reference to FIGS. 1 and 2, each transversely extending set or series of slabs 38 is held in position by transversely extending series of keys 39. The keys are generally shorter in length than the slabs and, therefore, a greater number of keys extend across the width of the chamber 16. The keys 39 have the bottom portion thereof received in the refractory blocks defining the lower refractory section 19. The keys and slabs are so interconnected that interfacial areas are in contact with one another between each slab and key. The contacting, interfacial area of the slabs and keys permits conductive heat transfer between the various elements and along the full length of the chamber 16 whereby heat is conducted from the hotter zones of the chamber to the cooler zones thereof.

The slabs 38 and the keys 39, since they are preferably made from a carbonaceous material, which is substantially less dense than the molten tin, are raised above the lower refractory section 19 by a buoyant force exerted thereon by the tin. The slabs do not rise to the top surface of the tin and float thereupon because of the manner in which the keys anchor the slabs to the refractory block. A depth of molten tin above the slabs is maintained at a level of from ½ to 4 inches in order to reduce the likelihood of the glass ribbon 18 coming into contact with the slabs if and when the glass ribbon buckles within the chamber.

As best seen in FIG. 2, the refractory side blocks 21 have a sidewall liner 41 extending along the various zones of the chamber wherein the solid carbonaceous material is utilized to line the chamber. The sidewall liner 41 is utilized to protect the side refractory blocks in the event the glass ribbon 18 ruptures and a portion thereof moves toward the sidewall of the chamber. The sidewall liner 41 may be constructed in accordance with the principles and teachings of copending U.S. patent application S.N. 637,733, filed May 11, 1967, now U.S. Patent 3,481,729, and assigned to the same assignee as this application.

With reference to FIG. 2 of the drawings, there is shown therein the division of the chamber 16 into the various functionally classified zones utilized in the manufacture of flat glass by the float process.

More particularly, the chamber 16 has as an initial zone a flow-out zone 42. In this particular zone, the molten glass 12 is poured out upon the molten tin bath 14. Also, in this zone of the chamber, sufficient heat is added by means of electrical heaters 31 to insure that the molten glass poured on the tin will spread out and form the ribbon of glass 18. The ribbon will have a width determined by the equilibrium thickness to which the glass material spreads out upon the bath.

After flowing out to the equilibrium thickness, the glass ribbon 18 passes into a first cooling zone 43. The first cooling zone is maintained at a temperature substantially below the temperature at which the flow-out zone is maintained. In order to maintain the two zones at substantially different temperatures, a radiation gate (not shown), extending across the width of the chamber 16, may be secured to the upper refractory section 22 and extend downwardly therefrom to within one or two inches of the glass ribbon 18 passing through the chamber. In the first cooling zone, the molten glass material is solidified sufficiently so that it achieves a semi-rigid state by the time the glass leaves the zone. In this particular state, the glass would have a temperature of approximately 1450° F.

The glass ribbon passes from the first cooling zone 43 to an edge-holding zone 44. If the chamber 16 is being utilized to manufacture glass having a thickness less than equilibrium, edge rolls (not shown) are brought into gripping relationship with the glass ribbon 18 in the edge-holding zone such that the ribbon has a gripping force applied thereto. This gripping force tends to retard the advancement of the ribbon in a direction downstream of the chamber against the tractive force applied to the ribbon by the driven traction rolls 33. Control of the amount of tractive effort applied to the ribbon by the traction rolls is one method of controlling the stretching of the ribbon between the edge rolls and the traction rolls.

After the glass ribbon proceeds through the edge-holding zone 44, it passes into a reheat and stretching zone 46 wherein the glass ribbon is reheated to a temperature in the range of 1600° F. to 1650° F. Sufficient heat is added to the glass ribbon in this zone so the glass becomes plastic and may be drawn down to a reduced thickness. In the reheat and stretching zone, additional electrical heating elements 31 are provided for supplying the heat. The amount of heat added in the zone also affects the thickness to which the ribbon may be drawn down.

After passing through the reheat and stretching zone 46, the glass ribbon 18 passes into a stretching zone 47 whereat sufficient heat has been added to the ribbon to make the glass plastic. Between the gripping force applied to the ribbon by the edge rolls (not shown) in the edge-holding zone, and the tractive force applied to the ribbon by the traction rolls 33 in the annealing lehr 36, the glass is stretched out and has its thickness reduced to form the finished glass of desired thickness.

The glass ribbon 18 moves out of the stretching zone 47 and then into a second cooling zone 48. The second cooling zone may be separated from the stretching zone by a radiation gate (not shown) extending downwardly from the upper refractory section 22 to within a few inches of the glass ribbon moving thereunder. Heat is removed from the glass ribbon in the second cooling zone such that the ribbon of glass becomes self-supporting and may pass into the take-off zone 49. The ribbon is thereafter removed from the take-off zone of the chamber 16 by the driven traction rolls 33 without any marks being put into the surface of the ribbon thereby.

The above outlined zones of the float chamber are illustrative of the zones into which the chamber may be functionally classified. It is understood that the particular zones may or may not be utilized in dependence upon whether equilibrium thickness or non-equilibrium thickness glass is being manufactured in the chamber.

Improved chamber construction

In accordance with the principles and teachings of this invention, the thermal conductance of the carbonaceous material utilized to line the glass manufacturing chamber is controlled so as to provide prescribed heat conducting characteristics in various functionally classified zones of the chamber. More particularly, in the cooling zones of the chamber, it is desirable to restrict conductive heat transfer through the carbonaceous liner along the length of the chamber in order to maintain a pre-established temperature profile throughout the length of the chamber. In the other zones of the chamber, it is desirable to promote rapid heat transfer in all directions throughout the zones so that uniform temperature profiles exist across the width of the chamber at spaced increments along the length of these zones.

In forming the glass ribbon 18, the molten glass 12 is poured out upon the tin bath 14 in the flow-out zone 42 of the chamber. In this zone, the temperature must be maintained at such a level that sufficient heat is available to permit the molten glass 12 to remain fluid so that it may flow out and form the ribbon 18. In the flow-out zone of the improved chamber, the carbonaceous liner material 38 has a high thermal conductance to promote conduction of heat both along the length of and across the width of the chamber so that heat is distributed uniformly throughout the zone to establish a uniform, nearly constant temperature profile across the ribbon 18 from edge to edge thereof.

The ribbon 18 passes from the flow-out zone 42 into the first cooling zone 43. In this zone, a substantial temperature drop is brought about by coolers (not shown) located above the ribbon. Also, a radiation gate (not shown) is utilized to isolate the flow-out zone from the first cooling zone. In accordance with the principles and teachings of this invention, the carbonaceous liner 38 in the first cooling zone, has a low thermal conductance so that conductive heat transfer between the contacting liner of the flow-out zone and the liner of the first cooling zone is substantially reduced. The thermal conductance of the carbonaceous material utilized in the first cooling zone may be reduced by either of two procedures as described below.

In a first way of controlling the thermal conductance of the liner, carbonaceous material having approximately the same thermal conductivities may be utilized in both the flow-out zone and the first cooling zone. However, the thickness of the liner slabs 38 in the first cooling zone is less than the thickness of the liner slabs used in the flow-out zone 42 although slabs forming both liners are of substantial thickness. For example, the liner slabs in the first cooling zone may be ½ to 1½ inches in thickness while the liner slabs in the flow-out zone may be 2 to 4 inches in thickness.

In an alternate way of controlling the thermal conductance of the liner, the carbonaceous material 38a (FIG. 1) utilized in the first cooling zone 43 may be of approximately the same thickness as the liner material 38 utilized in the flow-out zone 42 but the materials will have different thermal conductivities. For example, a fine grade premium graphite or high density premium graphite material, can be utilized to construct the liner and keys in the flow-out zone of the chamber wherein a high thermal conductance is desired. The aforementioned materials have a thermal conductivity in the area of 65 B.t.u.-ft./hr.-ft.$^2$ ° F.

The carbonaceous material utilized to construct the liner slabs and keys for the first cooling zone 43 may be selected from various grades of porous graphite material or porous carbon material in order to suit the exact requirements of a specific chamber. The aforementioned types of porous graphite and porous carbon material have thermal conductivities ranging from a high value of 50 B.t.u.-ft./hr.-ft.$^2$ ° F. to a low value of 1 B.t.u.-ft./hr.-ft.$^2$ ° F. All of the mentioned types of carbonaceous materials may be obtained from the National Carbon Company, Division of Union Carbide Corporation.

In a glass manufacturing chamber in which adjacent zones must be maintained at two different temperatures, such as between the flow-out and the first cooling zones, this invention in its preferred form teaches the desirability of utilizing a carbonaceous liner material having substantially different thermal conductances in each of the zones. By utilizing such materials, the high conductance liner material permits conductance of heat throughout the high temperature zone thereby to establish constant and uniform temperatures across the chamber and the glass ribbon in that zone at all points along the length of the zone. On the other hand, the low thermal conductance material utilized in the cool zones reduces the conductive heat losses through the liner from the hot zone to the cool zone.

With reference again to FIG. 2, the glass ribbon 18, after it passes through the first cooling zone 43, enters an edge holding zone 44 wherein opposite edges of the ribbon are gripped by gripping rolls (not shown). The gripping rolls provide a tension force on the glass ribbon 18 against which the pulling action of the rolls 33 in the lehr 36 cause the ribbon 18 to be stretched in a direction along the length of the chamber toward the lehr.

After the edge holding zone 44, the glass ribbon 18 enters a reheat and stretching zone 46 in which electrical heaters 31 add sufficient heat to the glass to once again raise the temperature of the glass sufficiently to permit the glass to be stretched in a stretching zone 47 of the chamber. In the edge holding zone, the reheat and stretching zone and the stretching zone, the liner slabs 38 are again formed of a carbonaceous material having a high thermal conductance. Again, the purpose of having a high thermal conductance in these zones is to permit a uniform reheating of the glass ribbon and the development of a uniform, almost constant, temperature profile across the glass ribbon 18 as it passes through these zones and is stretched.

After being stretched, the glass ribbon 18 enters a second cooling zone 48 wherein coolers (not shown) positioned above the glass ribbon remove sufficient heat from the glass so that the glass may be taken from the chamber at a take-off zone 49 of the chamber without marks being imparted to the surface of the ribbon. In accordance with the principles of this invention, the liner slabs in the second cooling zone are formed of a carbonaceous material having a low thermal conductance. Here, the low conductance material is utilized so as to reduce the dissipation of heat from the preceding zones to this cooling zone by conductance through the interconnected carbonaceous liner material in the various zones.

In accordance with the teachings of this invention, the zones of different thermal conductance may be constructed such that the thermal conductance is substantially uniform in each zone while at the interfacial area between the zones the thermal conductance changes from one value to the other value. Also, the zones of high and low thermal conductance may be interconnected by material having a gradation in thermal conductivity or thickness so that the thermal conductance varies across the area between the adjacent zones. In either embodiment, the method and chamber of this invention sets forth the unique principle of promoting conductive heat transfer in selected zones while restricting the conductive heat losses from hot zones to cool zones through the liner material utilized to protect the chamber.

There has been disclosed herein a method of and chamber for the manufacture of flat glass which controls the conductive heat transfer through a liner of carbonaceous material in various functionally classified zones of the chamber. The thermal conductance is controlled by utilizing material either of variable thickness or of variable thermal conductivity. The method and chamber of this invention insure a more uniform heat distribution in the various zones of the chamber while also reducing the conduction of heat through the liner material between various zones.

In view of the teachings of this specification relative to the method of and chamber of this invention, modifications thereof will be apparent to those skilled in the art. It is intended that all such modifications which fall within the true spirit and scope of this invention be included within the spirit and scope of the appended claims.

What is claimed is:

1. A method of manufacturing flat glass wherein molten glass is poured out upon a molten metal bath confined by refractory material within a substantially enclosed chamber having a protective atmosphere therein, which method comprises the steps of: providing in the enclosed chamber for the refractory material a carbonaceous material liner means, at least a portion of said liner means being positioned below the top surface of said molten metal bath; controlling the thermal conductance of different longitudinally spaced areas of said liner means such that at least two longitudinally spaced areas of said liner means are present, respectively, in two functionally classified, longitudinally spaced zones of the chamber, one area having a high thermal conductance and the other area having a low thermal conductance; maintaining the zone in which said high conductance liner means is located at a relatively high temperature; and maintaining the zone in which said low conductance liner means is located at a lower temperature below said high temperature.

2. The improved chamber for the manufacture of flat glass as defined in claim 1 wherein said high temperature zone is the flow-out zones of the chamber and said lower temperature zone is the first cooling zone of the chamber.

3. The improved chamber for the manufacture of flat glass as defined in claim 1 wherein said high temperature zone is the reheat and stretching zone of the chamber and wherein said lower temperature zone is the second cooling zone of the chamber.

4. A method of manufacturing flat glass wherein molten glass is poured out upon a molten metal bath confined by refractory material within a substantially enclosed chamber having a protective atmosphere therein, which method comprises the steps of: providing in the enclosed chamber for the refractory material a carbonaceous liner means, at least a portion of said liner means being positioned below the top surface of said molten metal bath; controlling the thermal conductance of the carbonaceous liner means between longitudinally spaced zones of the chamber to establish a graduation of thermal conductance in the liner means from an area of high conductance to an area of low conductance between two functionally classified, longitudinally spaced zones of the chamber; maintaining the high conductance zone at a relatively high temperature; and maintaining the low conductance zone at a lower temperature below said high temperature.

5. The improved chamber for the manufacture of flat glass as defined in claim 4 wherein said high temperature zone is the flow-out zone of the chamber and wherein said lower temperature zone is the first cooling zone of the chamber.

6. The improved chamber for the manufacture of flat glass as defined in claim 4 wherein said high temperature zone is the reheat and stretching zone of the chamber and wherein said lower temperature zone is the second cooling zone of the chamber.

7. A method of manufacturing flat glass wherein molten glass is poured out upon a molten metal bath confined by refractory material within a substantially enclosed chamber having a protective atmosphere therein, which method comprises the steps of: providing in the enclosed chamber for the refractory material a carbonaceous liner means, at least a portion of said liner means being positioned below the top surface of said molten metal bath; controlling the thermal conductance of different areas of said carbonaceous liner means such that at least two distinct areas of said carbonaceous liner means are present, respectively in two distinct, functionally classified, longitudinally spaced zones of the chamber, one distinct area having a high thermal conductance and the other distinct area having a low thermal conductatnce, said two areas being in adjacent, longitudinally spaced zones of said chamber and having a contacting, interfacial area therebetween; maintaining the zone in which said high conductance liner means is located at a relatively high temperature; and maintaining the zone in which said low conductance liner means is located at a temperature below said high temperature; the high thermal conductance liner means permitting a uniform temperature profile to be established across the glass in the high temperature zone by permitting rapid transfer of heat throughout the zone, and the low thermal conductance liner means substantially reducing the amount of heat dissipated along the length of the chamber from said one area to said other area through said contacting, interfacial area between said two areas of carbonaceous liner means.

8. A method of manufacturing flat glass wherein molten glass is poured out on a molten metal bath contained by refractory material within a substantially enclosed chamber having a protective atmosphere contained therein, which method comprises the steps of: providing in the enclosed chamber for the refractory material a carbonaceous liner means, at least a portion of said liner means being positioned below the top surface of said molten bath; controlling the thermal conductivity of different areas of said carbonaceous liner means such that at least two distinct areas of said liner means are present, respectively, in two distinct, functionally classified, longitudinally spaced zones of said chamber, the two said areas being in adjacent zones of said chamber and having a contacting, interfacial area therebetween, maintaining at a relatively high temperature one functionally classified zone of said chamber having carbonaceous liner means theretin with a relatively high thermal conductivity so that heat in the central portion of said one zone is at least partially transferred through said high conductivity liner means to the edges of said zone adjacent the outside walls of the chamber thereby to establish a substantially uniform temperature profile across a ribbon of glass floating on said molten metal bath in said one zone, maintaining at a temperature below said high temperature the other functionally classified zone of said chamber having carbonaceous liner means therein with a relatively low thermal conductivity so that the amount of heat conducted between said two adjacent zones across said contacting, interfacial area therebetween is retarded.

9. A method of manufacturing flat glass wherein molten glass is poured out upon a molten metal bath confined by refractory material within a substantially enclosed chamber having a protective atmosphere therein, which method comprises the steps of: providing in the enclosed chamber for the refractory material a carbonaceous liner means, at least a portion of said liner means being positioned below the top surface of said molten metal bath; controlling the thermal conductivity of different areas of said carbonaceous liner means such that at least two distinct areas of said liner means are present, respectively, in two distinct, functionally classified longitudinally spaced zones of the chamber, one distinct area having a high thermal conductivity and the other distinct area having a low thermal conductivity, said two areas being in adjacent longitudinally spaced zones of said chamber and having a contacting, interfacial area therebetween; maintaining the zone in which said high conductivity liner means is located at a relatively high temperature; and maintaining the zone in which said low thermal conductivity liner means is located at a temperature below said high temperature; the high thermal conductivity liner means permitting a uniform temperature profile to be established across the glass in the high temperature zone by permitting rapid transfer of heat throughout the zone, and the low thermal conductivity liner means substantially reducing the amount of heat dissipated along the length of the chamber from said one area to said other area through said contacting, interfacial area between said two areas of carbonaceous liner means.

10. A chamber utilized for the manufacture of flat glass and having a plurality of functionally classified, longitudinally spaced zones therein: a plurality of refractory ceramic blocks defining an elongated cavity for receiving and supporting a molten metal bath therein; a plurality of first carbonaceous liner block means having a high thermal conductance for protecting said cavity; means for mounting said plurality of first liner block means above a portion of said refractory blocks defining a hot zone of the chamber; a plurality of second carbonaceous liner block means having a low thermal conductance for protecting said cavity; means for mounting said plurality of second liner block means above a portion of said plurality of refractory blocks defining a cool zone of the chamber, said cool zone being both longitudinally spaced from and adjacent said hot zone of the chamber; said first and said second liner block means having a contacting, interfacial area between said longitudinally spaced but adjacent zones and forming a continuous, uninterrupted lining for and between at least a portion of said zones; said liner block means in said cool zone restricting the dissipation of heat from said hot zone to said cool zone by conduction through said contacting, interfacial area.

11. The improved chamber for the manufacture of flat glass as defined in claim 10 wherein the thermal conductance of said liner block means are controlled by utilizing carbonaceous material means of two different, substantial thicknesses to form said liner block means, said high conductance liner block means being substantially thicker than said low conductance liner block means.

References Cited
UNITED STATES PATENTS

| | | | |
|---|---|---|---|
| 3,301,651 | 1/1967 | Long | 65—99 |
| 3,393,061 | 7/1968 | Greenler et al. | 65—99 |
| 3,399,985 | 9/1968 | Greenler et al. | 65—99 |
| 3,457,056 | 7/1969 | Greenler. | |
| 3,481,728 | 12/1969 | Basler et al. | 65—182 |

OTHER REFERENCES

South African patent application, Emile Plumat, Nov. 18, 1963, pp. 1–11 and drawing, No. 635,217.

S. LEON BASHORE, Primary Examiner

E. R. FREEDMAN, Assistant Examiner

U.S. Cl. X.R.

65—91, 99, 182